United States Patent
Zhao et al.

(10) Patent No.: US 9,377,872 B2
(45) Date of Patent: Jun. 28, 2016

(54) ELECTRONIC DEVICE AND CONTROL METHOD

(71) Applicant: Lenovo (Beijing) Co., Ltd., Beijing (CN)

(72) Inventors: Lei Zhao, Beijing (CN); Yu Chen, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 481 days.

(21) Appl. No.: 13/846,164

(22) Filed: Mar. 18, 2013

(65) Prior Publication Data
US 2013/0249789 A1    Sep. 26, 2013

(30) Foreign Application Priority Data
Mar. 26, 2012    (CN) .......................... 2012 1 0082847

(51) Int. Cl.
*G09G 5/00*    (2006.01)
*G06F 3/03*    (2006.01)
*G06F 3/01*    (2006.01)

(52) U.S. Cl.
CPC . *G06F 3/03* (2013.01); *G06F 3/016* (2013.01)

(58) Field of Classification Search
CPC ................ A63F 2009/2435; A63F 2300/1093; A63F 2300/6045; A63F 3/00643; A63F 13/06; A63F 13/10; A63F 2003/00662; A63F 2009/2419; A63F 2009/242; A63F 2003/00195; A63F 2003/00223; A63F 2003/00258; A63F 2300/6623; A63F 2300/6684; A63F 2300/8011; A63F 2300/8017; A63F 13/211; A63F 2009/0087; A63F 2009/2442; A63F 2009/2447; A63F 2009/2457; A63F 2300/1068; A63F 2300/306; A63F 2300/535; G06F 3/011; G06F 3/017; G06F 3/005; G06F 3/016; G06F 3/167; G06F 3/033; G06F 2203/014; G06F 3/04812; G06F 3/0484; G06F 17/30312; G06F 1/1626; G06F 3/038
USPC .................................. 345/156, 169, 173–175
See application file for complete search history.

(56) References Cited

U.S. PATENT DOCUMENTS 5,807,178 A    9/1998    Todokoro
8,265,896 B2    9/2012    Yang
(Continued)

FOREIGN PATENT DOCUMENTS

| CN | 2275891 | 3/1998 |
|---|---|---|
| CN | 101156987 | 4/2008 |
| CN | 101995973 | 3/2011 |
| CN | 101022863 | 7/2011 |

OTHER PUBLICATIONS

First Office Action dated Jan. 30, 2014 in corresponding Chinese priority application 201210082847.X (16 pages including English translation).

(Continued)

*Primary Examiner* — Duc Dinh
(74) *Attorney, Agent, or Firm* — Brinks Gilson & Lione; G. Peter Nichols

(57) ABSTRACT

An electronic device and the control method thereof are described. The electronic device includes a panel provided at a first outer surface of the electronic device; an instruction generating unit configured to generate setting instructions; a position control unit overlapping the panel and configured to control the relative position of at least one part of the operation object on the panel with respect to the panel.

15 Claims, 2 Drawing Sheets

(56) References Cited

U.S. PATENT DOCUMENTS

| | | | |
|---|---|---|---|
| 2007/0216095 A1* | 9/2007 | Jacobs | 273/288 |
| 2008/0058045 A1 | 3/2008 | Cortenraad et al. | |
| 2010/0123287 A1* | 5/2010 | Winter et al. | 273/249 |
| 2010/0331083 A1* | 12/2010 | Maharbiz et al. | 463/30 |
| 2011/0040520 A1 | 2/2011 | Yang | |
| 2011/0272884 A1* | 11/2011 | Kraegeloh et al. | 273/237 |

OTHER PUBLICATIONS

Second Office Action dated Sep. 12, 2014 in corresponding Chinese priority application 201210082847.X (19 pages including English translation).

* cited by examiner

ELECTRONIC DEVICE AND CONTROL METHOD

This application claims priority to Chinese patent application No. CN201210082847.X. filed on Mar. 26, 2012, the entire contents of each are incorporated herein by reference.

BACKGROUND

The present invention relates to an electronic device and the control method for the electronic device.

With the development of technology, electronic devices such as such as personal computers, digital cameras, mobile phones, portable computers, pad computers, multimedia players and the like are widely used. These electronic devices typically comprises an input unit for receiving a user's manipulation input, such as a keyboard, mouse, a touch screen or the like, and an output unit, such as a display screen or the like, for receiving the user's input and display correspondingly according to the user's input. However, although more and more applications with powerful functions, friendly-interface and good entertainment competence, these electronic devices typically can only simulate the real scenes and display them to the user. The user thus can not get the real experience.

SUMMARY

In order to address the above-mentioned problems in the prior art, the present invention provides a new type of interactive mode. Specifically, the present invention provides an electronic device and a control method applied to the electronic device.

One embodiment of the present invention provides an electronic device, comprising: a panel, provided at a first outer surface of the electronic device; a instruction generating unit, configured to generate setting instructions; a position control unit, overlapping the panel, configured control the relative position of at least one part of the operation object on the panel with respect to the panel according to the setting instructions.

Another embodiment of the present invention provides a control method used in an electronic device. The method comprises: generating setting instructions; controlling the operation object on the panel of the electronic device by the position control unit of the electronic device according to the setting instructions, wherein, in the electronic device, the panel is set to overlap the position control unit.

With the electronic device and control method according to the embodiment of the present invention, the position control unit set to overlap the panel of the electronic device can control at least one part of the operation object placed thereon so as to change the relative position of the at least one part of the operation object with respect to the panel, so that the user can visually observe the change of the operation object, thus obtaining the real user experience.

BRIEF DESCRIPTION OF THE DRAWINGS

In order to more clearly illustrate the technical solution of the embodiment of the present invention, the drawings required to be used in the description of the embodiment of the present invention will be briefly described below.

DETAILED DESCRIPTION

Figure 1:
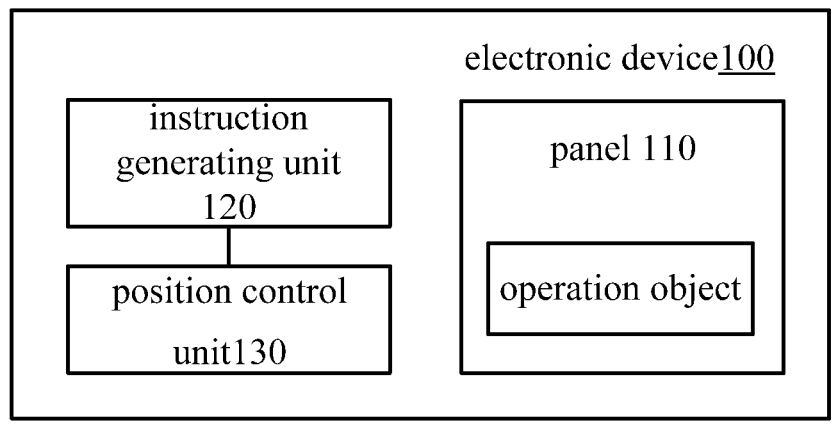
FIG. 1 is an exemplary block diagram of the electronic device according to one embodiment of the present invention.

Hereinafter, the preferable embodiments of the present invention will be described in detail with reference to the accompanying drawings. It should be noted that in the present specification and the drawings, the same elements are indicated with the same reference numerals, and repeated explanation of these elements will be omitted.

FIG. 1 illustrates an exemplary block diagram of the electronic device 100 according to one embodiment of the present invention. As shown in FIG. 1, the electronic device 100 comprises a panel 110, an instruction generating unit 120 and a position control unit 130. Specifically, in the embodiment shown in FIG. 1, the panel 110 is provided at a first outer surface of the electronic device and the panel can support the operation object placed on it. According to the example of the present invention, the first outer surface can be the top surface of the electronic device 100. When the electronic device 100 is put in an available state, the first outer surface can be horizontal. Alternatively, when the electronic device 100 is put in an available state, the first outer surface can also be inclined. In addition, the first outer surface can also be a side or bottom surface of the electronic device 100.

The position control unit 130 overlaps the panel 110. The instruction generating unit 120 can generate setting instructions, and send them to the position control unit 130. The position control unit 130 can control the relative position of at least one part of the operation object on the panel with respect to the panel according to the setting instructions generated by the instruction generating unit 120. For example, as described below, the position control unit 130 can control the contact position, the projection position with respect to the panel 110 and/or the distance from the at least one part of the operation object on the panel and the like according to the setting instructions generated by the instruction generating unit 120.

The operation object can be an object moving on the panel 110 through the magnetic force, gravity, and/or the power provided by itself. When the operation object is on the panel 110, the position control unit 130 can control the relative position of the operation object with respect to the panel 110 according to the setting instructions generated by the instruction generating unit 120. For example, the operation object can be a small ball or a model car and the like capable of moving on the panel 110. In the case where the position control unit 130 does not control the operation object, when the operating object is placed on the panel 110, the operation object can be stationary. Alternatively, when the operation object is placed on the said panel, the operator can give the object a certain initial speed. Later the operation object will be further described in combination with the position control unit 130

Alternatively, the operation object can also comprise a plurality of components. When the operation object is placed on the panel, the relative positions of the one or more components with respect to the panel are controlled through the position control unit. Specifically, when the operation object is on the panel 110, the position control unit 130 can control the distance between each component of the operation object and the panel 110, the projection position on the panel 110 and the like according to the setting instructions generated by the instruction generation unit 120. However, the position of the operation object itself with respect to the panel 110 will not change in response to the control of the position control unit 130.

For example, the operation object can be a simulated keyboard similar to a piano keyboard. When the operation object is placed on the panel, the relative position of one or more keys in the keyboard with respect to the panel can be simulated through the position control unit. For example, one or more keys can be controlled to be close the panel, or the one or more keys close to the panel can be released so as to make it return to the initial position.

On the other hand, the position control unit 130 can control the relative position of the at least one part of the operation object on the panel with respect to the panel through a magnetic force and/or by making the panel 110 deform. The area of the position control unit 130 can be the same or similar to the area of the panel 110. Alternatively, the area of the position control unit 130 can be smaller than the area of the panel 110.

For example, in the case where the area of the position control unit 130 is the same as or similar to the area of the panel 110, the position control unit 130 can comprise a plurality of position control modules. The position control unit can control at least one of the plurality of position control modules to generate control signals according to the setting instructions so as to change the operation object on the panel.

For example, the position control unit 130 can be a magnet array set to overlap the panel. Preferably, the position control unit can be a magnet array set to overlap the panel and the magnet array can comprise a plurality of electromagnet modules which can be independently controlled to be on or off. Further, according to one example of the present invention, the electronic device 100 shown in FIG. 1 can also comprise a switching control unit (not shown). The switching control unit can control each of the electromagnet modules in the electromagnet array to be on or off, wherein the relative position of the operation object with respect to the panel is changed through turned on electromagnet modules.

According to one embodiment of the present invention, in the case where the position control unit is a magnet unit set to overlap the panel, the operation object comprises a magnetic inductive component corresponding to the magnet unit. For example, the operation object can be a small ball. The small ball can comprise a metal block or a magnetic block. The user could release the small ball and give a certain horizontal initial speed to the small ball when releasing it, so that the small ball can roll on the panel 110 at this initial speed and the movement direction, speed and the like of the small metal ball can be controlled by the turned-on electromagnet unit.

For example, when the ball comprising a magnetic block is rolling on the panel 110, the electromagnet module in a specific position in the electromagnet array can be turned on, so that the electromagnet module can have a first polarity the same with that of the magnetic block in the small ball or a second polarity opposite to that of the magnetic block in the small ball so that the small ball can be controlled to leave or get close to a certain area of the panel or the small ball can be made to accelerate or decelerate when passing through certain areas in the panel.

In addition, when the small ball comprising a metal block is rolling on the panel 110, it is possible to turn on an electromagnet module in the traveling direction of the small ball in front of the current position of the ball in the electromagnet array module so as to make the small ball accelerate. On the other hand, it is possible to turn on an electromagnet module in the traveling direction of the small ball behind the current position of the small ball in the electromagnet module so as to make the small ball decelerate.

Further, the position control unit 130 can be an ordinary magnet array set to overlap the panel and the magnet array can comprise a plurality of magnet modules. The distance from the plurality of magnet modules to the panel 110 can be controlled independently. The position control unit 130 can make the magnet module in the magnet array get close to or get apart from the panel 110 according to the setting instruction generated by the instruction generating unit 120, thereby controlling the magnetic force generated by the magnet modules applied on the object. For example, when the distance between the magnet module and the panel 110 is greater than a predetermined threshold value, the influence of the magnet module on the operation object can be ignored. When the distance between the magnet module and the panel 110 is less than a predetermined threshold value, the smaller the distance between the magnet module and the panel 110, the greater the magnetic force applied on the operation object.

In addition, the panel 110 can be a flexible panel, and the position control unit is a panel deformation control unit set to overlap the panel. And the panel deformation control unit can comprise a plurality of deformation control modules that can independently control the projections or recesses of the flexible panel. Preferably, the electronic device 100 shown in FIG. 1 can also comprise an up-down control unit (not shown). The up-down control unit can control each of the deformation control module in the panel deformation control unit to ascend/descend, wherein the form of the flexible panel can be changed by ascending/descending of the deformation control module so as to change the relative position of the at least one part of the operation object on the panel with respect to the panel. For example, as described above, the operation object can be a small ball. By the ascending or descending of the deformation control module, the movement direction, speed, etc. of the small ball can be controlled to change the shape of the flexible panel.

Alternatively, in the case where the area of the position control unit 130 is smaller than the area of the panel 110, the electronic device 100 can further comprise a moving device connected to the position control unit 130. The moving device can move the position control unit 130 in an area corresponding to the panel according to the setting instructions generated by the instruction generating unit 120. For example, in the above case where the panel deformation control unit comprises a deformation control module, the moving device can move the deformation control module according to the setting instructions so as to make the flexible panel to project or depress in the specific area.

For example, the moving device can be a first rod and a second rod provided beneath the panel 110 and the position control unit 130 can be a magnetic positioning plate provided beneath the panel 110. The first rod can move left and right with respect to the panel and the second rod can move up and down with respect to the panel. The magnetic positioning plates can be in flexible connection with the first level and the second level respectively. The magnetic positioning plate can move to any position on the panel by the cooperation of the first rod and the second lever. When the operation object (assuming according to an example of the present invention, the operation object itself does not have kinetic energy to move) is put stationary on the panel, the magnetic positioning plate can attract the operation object with the panel 110 therebetween. The instruction generating unit 120 controls the movement of the first rod and the second rod in order to move the magnetic positioning plate, so that the operation object moves together with the magnetic positioning plate under the action of the magnetic force, so that the relative position of the operation object with respect to the panel 110 changes.

Further, according to another example of the present invention, the electronic device 100 can further comprise a storage unit. The storage unit can store a predetermined movement track. The instruction generation unit 120 can generate setting instructions according to the predetermined movement track. For example, assuming that the operation object is a model car comprising driving means (such as a micro-motor, and a magnetic inductive component), and the position control unit 130 is an electromagnet array overlapping the panel, the user can set the predetermined route of the model car according to his/her preference. When the model car is placed on the panel 110, it can travel on the panel through its own driving means and the traveling route of the model car (i.e. the operation object) on the panel is the predetermined route. And the instruction generating unit 120 can generate setting instructions according to the predetermined movement track so that the position control unit 130 can turn on the corresponding electromagnet module according to the setting instructions to guide the movement direction of the model car. For example, the electromagnet module on the predetermined route is turned on so that the model car can move according to the predetermined route driven by its own diving means so as not to move to other positions (in another word, to deviate from the predetermined route). Furthermore, the position control unit 130 can turn on the corresponding electromagnet module according to the setting instructions, so as to control the change of the movement direction and speed of the model car. For example, the position control unit 130 can turn on the electromagnet module in front of the operation object in the traveling direction of the operation object and apply the polarity of the electromagnet module, so as to accelerate or decelerate the operation object. In addition, the position control unit 130 can turn on the electromagnet module behind the operation object in the traveling direction of the operation object, so as to change the moving direction of the operation object.

With the electronic device according to the embodiment of the present invention, the position control unit set to overlap the panel of the electronic device can control at least one part of the operation object placed thereon so as to change the relative position of the at least one part of the operation object with respect to the panel, so that the user can visually observe the change of the operation object, thus obtaining the real user experience.

Figure 2:
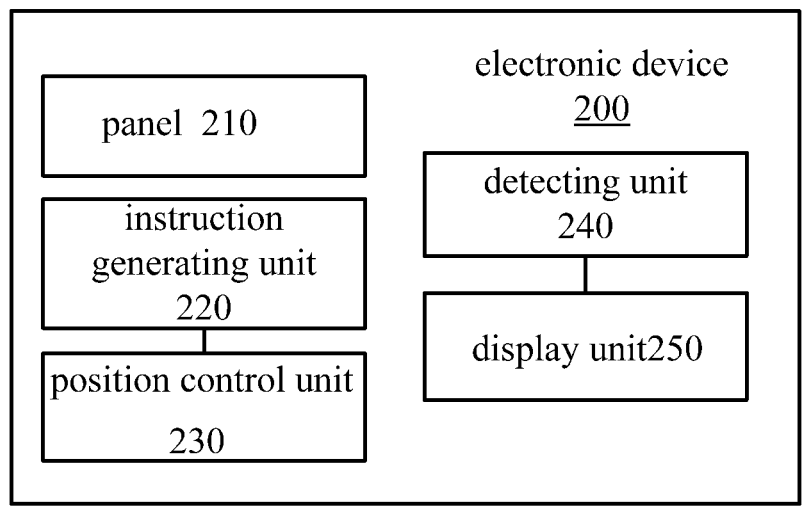
FIG. 2 is an exemplary block diagram of the electronic device according to another embodiment of the present invention.

FIG. 2 is an exemplary block diagram according to another embodiment of the present invention. Similar to the electronic device 100 shown in FIG. 1, the electronic device 200 comprises a panel 210, an instruction generating unit 220 and a position control unit 230. The panel 210 is provided in a first outer surface of the electronic device. The position control unit 230 overlaps the panel 210. In the present example, the operation object is an object that can move on the panel. When the operation object is put on the panel, the position control unit 230 can control the movement of the operation object on the panel, or when the operation object is on the panel, the operation object itself has the kinetic energy for moving on the panel. For example, the operation object can generate the kinetic energy for moving on the panel through its own driving means or the operation object can be provided with the kinetic energy for moving on the panel through the force applied by the user on the operation object.

The electronic device 200 further comprises a detecting unit 240 and a display unit 250. The detecting unit 240 can detect the movement of the operation object on the panel, and obtain movement parameters, such as the movement direction, movement speed and/or the movement track of the operation object. The display unit 250 can be set to overlap the panel 210. For example, the panel 210 can be a display panel. When the panel 210 is a flexible panel, the display unit 250 set to overlap the panel 210 can comprise a flexible screen. And the display unit 250 can display according to the movement parameters. For example, the display unit 250 can display the passing-by track of the operation object on the panel 210 according to the detection result of the detecting unit 240

In addition, according to another example of the present invention, the instruction generating unit 220 can also generate setting instructions according to the movement parameters. For example, when the user sets the destination of the operation object on the panel previously, the instruction generating unit 220 can generate setting instructions according to the movement direction, movement speed, and the current position of the operation object detected by the detecting unit 240, so as to make the position control unit 230 control the operation object to reach the predetermined destination. Alternatively, the electronic device 200 can also comprise a storage unit and a comparison unit. The storage unit can store the predetermined movement track. The comparison unit can compare the current position of the operation object and the predetermined movement track according to the detecting result of the detecting unit 240 and generate a comparison result. The instruction generating unit 220 can generate setting instructions according to the comparison result, so that the position control unit 230 controls the operation object to move according to the predetermined movement track.

With the electronic device according to embodiments of the present invention, the position control unit set to overlap the panel of the electronic device can control at least one part of the operation object placed thereon so as to change the relative position of the at least one part of the operation object with respect to the panel, so that the user can visually observe the change of operation object, thus obtaining the real using experience. In addition, when the operation object is moving on the panel, the electronic device according to the embodiment of the present invention can display to the user according to the movement parameters, such as the movement track, direction of the operation object and provide more movement information on the operation object to the user.

In addition, according to another example of the present invention, the electronic device 200 shown in FIG. 2 can further comprise an image processing unit. The image processing unit can generate an operation interface. Specifically, the image processing unit can generate the triggering area of the operation object in the operation interface according to the area setting input. The display unit 250 can also display the operation interface generated by the image processing unit. In the alternative embodiment, the display unit 250 can display merely the operation interface generated by the display image processing unit instead of displaying according to the detection result of the detecting unit. The instruction generating unit 220 can also generate setting instructions according to the area setting input, so that the position control unit 230 can control the movement of the operation object on the panel in the set triggering area.

For example, the image processing unit can generate the movement scene of the operation object as the operation interface. The user can set triggering areas such as uphill, downhill, and obstacles etc. in the movement scene according to his/her own preferences. In the case where the position control unit is an electromagnet array set to overlap the panel, the instruction generating unit 220 can generate corresponding setting instructions according to these trigging areas so as to set the pole and magnetic force of the electromagnet module in the electromagnet array in correspondence with the corresponding area.

In addition, when the operation object is moving on the panel 210, the instruction generating unit 220 can also generate the corresponding setting instructions according to the trigging area and the movement parameters of the operation object before entering specific trigging area obtained by the detecting unit 240. For example, the target triggering area that the operation object will enter is determined according to the movement parameters obtained by the detecting unit 240. Then the area type of the target trigging area is determined. When the detecting unit 240 detects that the operation object is entering the target trigging area, the instruction generating unit 220 can generate the corresponding setting instructions according to the movement parameters obtained by the detecting unit 240 and the area type of the determined target triggering area.

Specifically, in the case where the position control unit is the electromagnet array set to overlap the panel, the instruction generating unit 220 generates corresponding setting instructions according to the movement parameters obtained by the detecting unit 240 and the area type of the determined target triggering area to indicate the polarity and magnitude of the magnetic force of target electromagnet modules in the electromagnet array corresponding to the target triggering area. For example, when the operation object is a small ball comprising a magnetic block, the movement parameters of the small ball and the target triggering area that the small ball will enter can be obtained through the detecting unit, and the area type of the target triggering area is also determined. When the target triggering area is an obstacle area that can not be passed through, the instruction generating unit 220 can generate the polarity setting instruction, so as to set the polarity of the target electromagnet module in the electromagnet array corresponding to the target triggering area opposite to the electromagnet block in the small ball. And the instruction generating unit 220 can generate magnetic setting instructions according to the historic movement parameters, such as the movement direction and/or the movement speed and the like, of the small ball before it enters the target area, so as to set the magnitude of the magnetic force of the target electromagnetic module.

In addition, when the detecting unit 240 has not detected that the operation object has entered the triggering area, the display unit can display the triggering area in the first mode, whereas when the detecting unit 240 detects that the operation object has entered the triggering area, the display unit can display the triggering area in the second mode. In the first mode and the second modes, the display contents in the triggering area are different (e.g., the color, brightness in the triggering area, etc.).

In addition, the detecting unit 240 can also determine whether the operation object has passed through the triggering area. When the operation object has passed through the triggering area, the image processing unit can update the trigging area in the operation interface according to the movement parameters obtained by the detection unit. For example, in the case where the operation object is a small ball comprising a metal or magnetic block, when it is detected that the small ball is passing through the triggering area, the image processing unit can change the color of the triggering area so as to prompt the user that the operation object has entered the triggering area.

Further, when the operation object is passing through the triggering area, the instruction generating unit can also update the setting instructions according to the movement parameters obtained by the detecting unit. For example, when the movement parameters indicate that the small ball is passing through the area set as obstacles at high speed in a forward direction, the obstacle can be thought to be removed with the passing-by of the small ball. Therefore, the image processing unit can delete the obstacle area from the operation interface, and the instruction generating unit can also update the setting instructions so as to turn off the electromagnet module corresponding to the deleted obstacle. As another example, when the movement parameters indicate that the ball enters the area set as an obstacle with a certain angle and it has been rebounded by the area set as an obstacle instead of passing through the area, the obstacle can be thought to be not removed by the small ball. And the instruction generating unit can determine the degree of the damage to the obstacle by the small ball according to the speed and angle of the small ball when it enters the area, so as to update the setting instructions, thus adjusting the magnetic strength of the electromagnet module corresponding to the damaged obstacle area.

Figure 3:
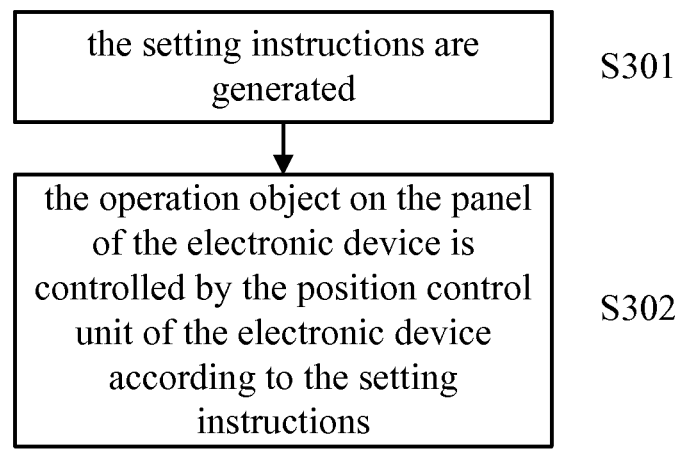
FIG. 3 illustrates a flowchart of the control method according to an embodiment of the present invention.

Hereinafter, a control method of an embodiment of the present invention will be described with reference to FIG. 3. FIG. 3 illustrates a flowchart of a control method 300 according to one embodiment of the present invention. The control method 300 is used for electronic devices. The various steps of the control method 300 can be implemented by corresponding units in the electronic device in FIG. 1. Therefore, for the sake of simplicity, the detailed description will be omitted.

For example, as shown in FIG. 3, at step S301, the setting instructions are generated. Then, at step S302, the operation object on the panel of the electronic device is controlled by the position control unit of the electronic device according to the setting instructions. In the embodiments shown in FIG. 3, the panel in the electronic device is set to overlap the position control unit.

According to one example of the present invention, the position control unit of the electronic device comprises a plurality of position control modules. At step S302, at least one of the plurality of position control modules is controlled to generate control signals according to the setting instructions so as to change the operation object on the panel. Alternatively, the position control module can comprise only one position control module. At step S302, the position of the position control module can be controlled according to the setting instructions so as to change the operation object on the panel. Alternatively, the predetermined movement track can be saved beforehand and at step S302, the setting instructions are generated according to the predetermined movement track.

Further, according to another example of the present invention, the operation object is an object capable of moving on the panel. For example, the operation object can be a small ball. At step S302, when the operation object is placed onto a panel, the operation object is controlled to move on the panel. Alternatively, the operation object can comprise a plurality of components. For example, the operation object can be a simulated keyboard similar to a piano keyboard. At step S302, when the operation object is placed onto a panel, the relative position of the one or more components with respect to the panel can be controlled by the position control unit according to the setting instruction.

With the control method according to an embodiment of the present invention, the position control unit set to overlap the panel of the electronic device can control at least one part of the operation object placed thereon so as to change the relative position of the at least one part of the operation object with respect to the panel, so that the user can visually observe the change of operation object, thus obtaining the real user experience.

Figure 4:
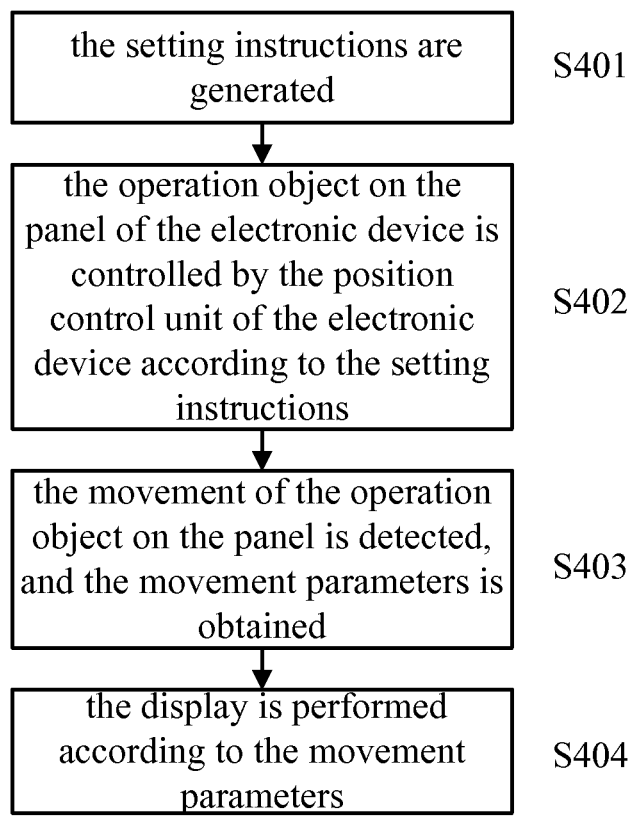
FIG. 4 illustrates a flowchart of the control method according to another embodiment of the present invention.

Hereinafter, a control method of an embodiment of the present invention will be described with reference to FIG. 4. FIG. 4 illustrates a flowchart of a control method 400 according to another embodiment of the present invention. The control method 400 is used for the electronic device. The various steps of the control method 400 can be implemented by corresponding units in the electronic device in FIG. 2. Therefore, for the sake of simplicity, the detailed description will be omitted.

For example, as shown in FIG. 4, at step S401, the setting instructions are generated. Then, at S402, the operation object on the panel of the electronic device is controlled by the position control unit of the electronic device according to the setting instructions. In the embodiments shown in FIG. 4, the panel in the electronic device is set to overlap the position control unit.

Further, the control method 400 shown in FIG. 4 can further comprise the following steps. At step S403, the movement of the operation object on the panel is detected and the movement parameters are obtained. Then, at step S404, the display is performed according to the movement parameters.

It should be noted that the respective steps of the method shown in FIG. 4 does not have to be executed in the shown order. Certain steps can be reversed or performed in parallel. For example, at the same time when detecting the movement of the operation object on the panel, obtaining the movement parameters (step S403) and displaying according to the movement parameters (step S404), the operation object on the panel of the electronic device can be controlled by the position control unit of the electronic device according to the setting instructions (step S402). It is also possible that step S403 and step S404 are performed before step S402 is performed. And at step S402, the setting instructions can be generated according to the detected movement parameters.

With the control method according to the embodiment of the present invention, the position control unit set to overlap the panel of the electronic device can control at least one part of the operation object placed thereon so as to change the relative position of the at least one part of the operation object with respect to the panel, so that the user can visually observe the change of operation object, thus obtaining the real user experience. In addition, when the operation object is moving on the panel, the electronic device according to the embodiment of the present invention can display to the user according to the movement parameters, such as the movement track, direction of the operation object and provide more movement information on the operation object to the user.

In addition, according to another example of the present invention, the control method 400 shown in FIG. 4 can further comprise generating an operation interface. Specifically, the triggering area of the operation object is generated in the operation interface according to the area configuration input. At step S402 the setting instructions are generated according to the area setting input. And alternatively, after step S403, the control method 400 shown in FIG. 4 can further comprise determining whether the operation object is passing through the triggering area; and when it is determined that the operation object has passed through the triggering area, updating the triggering area in the operation interface according to the obtained movement parameters. Furthermore, alternatively, when the operation object is passing through the triggering area, the setting instructions can be updated according to the movement parameters obtained by the detecting unit.

Those skilled in the art can appreciate that combined with the disclosed embodiments described herein, the units and the algorithm steps of each example can be implemented by electronic hardware, computer software, or a combination of both. In order to clearly illustrate the interchangeability of the hardware and software, the composition and steps of each example have been generally described in the above description in accordance with the functions. Whether these functions are performed by hardware or software depends on the particular specifications and the design constraints of the technical solution. Those skilled in the art can implement the described functions using different methods for each specific application, but this implementation should not be considered to be beyond the scope of the present invention.

Those skilled in the art should understand that various modifications, combinations, sub-combinations and replacements can be performed depending on the design requirements and other factors, as long as they fall within the scope of the appended claims and their equivalents.

What is claimed is:

1. An electronic device, comprising:
    a panel, provided at a first outer surface of the electronic device;
    an instruction generating unit, configured to generate setting instructions;
    a detecting unit, configured to detect a movement of an operation object on the panel, and obtain movement parameters;
    an image processing unit, configured to generate an operation interface, wherein the image processing unit generates a triggering area of the operation object in the operation interface according to an area setting input by a user;
    a display, set to overlap the panel, configured to display the operation interface;
    a position control unit, overlapping the panel, configured to control a relative position of at least one part of the operation object on the panel with respect to the panel according to the setting instructions and the movement parameters when the operation object is in the triggering area, wherein the instruction generating unit generates setting instructions according to the area setting input;
    wherein the detecting unit is also configured to determine whether the operation object has passed through the triggering area; the image processing unit is also configured to update the trigging area in the operation interface according to the movement parameters obtained by the detection unit when the operation object passes through the triggering area;
    wherein the instruction generating unit is also configured to update the setting instructions according to the movement parameters obtained by the detecting unit when the operation object passes through the triggering area.

2. The electronic device according to claim 1, wherein the operation object is an object capable of moving on the panel; and
    when the operation object is placed on the panel, the movement of the operation object on the panel is controlled by the position control unit.

3. The electronic device according to claim 1, wherein the operation object comprises a plurality of components, when the operation object is placed on the panel, the relative position of one component or the plurality of components with respect to the panel is controlled by the position control unit.

4. The electronic device according to claim 1, wherein the position control unit comprises a plurality of position control modules, wherein, the position control unit controls at least one of the plurality of position control modules to generate control signals according to the setting instructions, so as to change the operation object on the panel.

5. The electronic device according to claim 1, wherein the display is also configured to display according to the movement parameters.

6. The electronic device according to claim 1, further comprising:
a storage unit, configured to store a predetermined movement track; and
the instruction generation unit generates the setting instructions according to the predetermined movement track.

7. The electronic device according to claim 1, wherein
the position control unit is a magnet unit set to overlapping the panel
the operation object comprises a magnetic inductive component corresponding to the magnet unit.

8. The electronic device according to claim 7, wherein
the magnet unit is an electromagnet array, wherein the electromagnet array comprises a plurality of electromagnet modules which are able to be independently controlled to be on or off; and
a switching control unit, configured to control each of the electromagnet modules in the electromagnet array to be on or off, wherein the turned on electromagnet module changes the relative position of the at least one part of the operation object on the panel with respect to the panel.

9. The electronic device according to claim 8, wherein the operation object also comprises:
driving means, configured to drive the operation object to move on the panel, and
the magnetic inductive component is configured to change the movement direction of the operation object in respond to the magnet unit.

10. The electronic device according to claim 1, wherein
the panel is a flexible panel,
the position control unit is a panel deformation control unit set to overlap the panel.

11. A control method, applied to an electronic device with a panel, the method comprises:
generating setting instructions;
detecting the movement of an operation object on the panel and obtaining the movement parameters;
generating an operation interface, wherein a triggering area of the operation object is generated in the operation interface according to an area setting input by a user, wherein the step of generating setting instructions comprises:
generating the setting instructions according to the area setting input;
displaying the operation interface;
controlling an operation object on the panel of the electronic device by a position control unit of the electronic device according to the setting instructions and the movement parameters when the operation object is in the triggering area, wherein, in the electronic device, the panel is set to overlap the position control unit;
after the step of detecting the movement of the operation object on the panel and obtaining the movement parameters, further comprising:
determining whether the operation object passes through the triggering area according to the obtained movement parameters, and when the operation object is determined to be passing through the triggering area, updating the triggering area in the operation interface according to the obtained movement parameters
when the operation object passes through the triggering area, updating the setting instructions according to the obtained movement parameters.

12. The method according to claim 11, wherein
the position control unit comprises a plurality of position control modules.
the step of controlling the operation object on the panel of the electronic device by the position control unit of the electronic device according to the setting instructions comprises:
controlling at least one of the plurality of position control modules to generate control signals according to the setting instructions, so as to change the operation object on the panel.

13. The method according to claim 11, wherein
the operation object is an object capable of moving on the panel; and
the step of controlling the operation object on the panel of the electronic device by the position control unit of the electronic device according to the setting instructions comprises:
when the operation object is placed on the panel, controlling the movement of the operation object on the panel by the position control unit according to the setting instructions.

14. The method according to claim 13, further comprising: displaying according to the movement parameters.

15. The method according to claim 11, further comprising:
storing a predetermined movement track, and
the step of generating setting instructions comprising generating setting instructions according to the predetermined movement track.

* * * * *